US005899227A

United States Patent [19]

Stuart

[11] Patent Number: 5,899,227

[45] Date of Patent: May 4, 1999

[54] AIR TRANSFER VALVE FOR FUEL STORAGE TANKS

[75] Inventor: Graham M. Stuart, Surrey, United Kingdom

[73] Assignee: W&J Risbridger Limited, United Kingdom

[21] Appl. No.: 08/975,635

[22] Filed: Nov. 21, 1997

[30] Foreign Application Priority Data

| | | | |
|---|---|---|---|
| Apr. 22, 1997 | [GB] | United Kingdom | 9708056 |
| Oct. 9, 1997 | [GB] | United Kingdom | 9721483 |

[51] Int. Cl.[6] .......... F16K 24/04

[52] U.S. Cl. .......... 137/592; 137/202; 137/448

[58] Field of Search .......... 137/202, 448, 137/592

[56] References Cited

U.S. PATENT DOCUMENTS

| | | | |
|---|---|---|---|
| 4,640,304 | 2/1987 | Looney | 137/202 |
| 5,564,465 | 10/1996 | Pettesch | 137/448 |

*Primary Examiner*—Gerald A. Michalsky
*Attorney, Agent, or Firm*—Andrus, Sceales, Starke & Sawall

[57] ABSTRACT

In a fuel storage tank having a fill pipe arranged to discharge within the tank below the normal liquid level in the tank, an air transfer valve is mounted within the fill pipe above the normal maximum liquid level, the valve being normally closed and having an outlet communicating with the head space in the tank and an inlet directed away from the direction of fluid flow in the fill pipe. An operating mechanism within the valve opens the valve in response to increased pressure in the fill pipe arising from air or vapour carried by fuel flowing in the pipe. The air transfer valve is preferably attached to the inside of the fuel pipe just above the normal maximum liquid level. The operating device within the air transfer valve may be a valve which is normally held in its closed position by gravity or a light spring closure force. Air in the top of the fill pipe is compressed by the supply of liquid fuel, causing the valve to open and allow air to pass through the valve and into the head space of the tank by way of an opening in the wall of the fill pipe.

7 Claims, 4 Drawing Sheets

AIR TRANSFER VALVE FOR FUEL STORAGE TANKS

BACKGROUND OF THE INVENTION

This invention relates to fuel storage tanks, especially gasoline/petrol storage tanks and, in particular, is concerned with means for reducing the generation of fuel vapour during filling of such tanks.

In conventional installations, a fuel pipe extends into the storage tank from outside and has an outlet situated close to the bottom of the tank. When the tank is refilled or topped up, e.g. from a road tanker, fuel is delivered at a high flow rate by gravity feed through the fill pipe. This displaces vapour contained in the tank which is either recovered via a vapour recovery line back to the tanker or is vented to atmosphere via a vent valve.

During the start of the delivery process the fuel delivered by the tanker displaces the air mass or slug in the fill hose and fill pipe into the tank below the liquid level. In these circumstances, a great deal of fluid turbulence is generated in the tank which causes a break up of the stratified high density vapour layers immediately above the liquid surface in the tank. As a result, high density vapour is mixed with low density ullage vapour, increasing the particle count or average vapour density level of the displaced tank vapour. As high density vapour contains a significant fuel volume and fuel volume is metered directly into the tank by the tanker delivery system, this constitutes a loss by the owner of the filing station.

A secondary effect of passing a volume of air through liquid fuel is the direct generation of fuel vapour, thus adding to the total vapour volume and subsequent losses. This effect, combined with the disturbance of the vapour layers previously discussed, increases the ullage vapour pressure causing the vapour vent relief valve to open and remain open, even when fuel filling is completed again adding to vapour (fuel) losses, an environmental and economic concern.

EP-0327518 describes one solution to this problem. In the filling system proposed in this patent, holes are formed in the fill pipe above the normal liquid level in the tank so that the interior of the fill pipe communicates with the head space or ullage. A second, smaller inner tube is inserted concentrically into the fill pipe and has holes which connect its interior with the space between the two tubes. Fuel is filled via the inner tube and air and vapour passes through the holes in the inner tube into the space between the two tubes. Some vapour and air passes through the holes in the fill pipe into the head space, while vapour remaining between the two tubes is collected via a vapour recovery system.

GB Specification No. 2301347 describes a similar system in that the fill pipe is also fitted with a second, perforated inner tube. In this system, however, the fuel is introduced into the space between the fill pipe and the inner tube and air carried in with the fuel is stated to pass into the inner tube through the perforations, and vapour is collected from the inner tube via an external vapour collection system.

Both of the above systems are relatively costly and involve the introduction of a substantial number of pipework connections and potential fuel and vapour leakage points.

It is an object of the present invention to provide cost effective, integral means for controlling the turbulence and vapour generation during filling of fuel storage tanks, while avoiding the problems of the prior art.

SUMMARY OF THE INVENTION

According to one aspect of the present invention, there is provided a fuel storage tank having a fill pipe which is arranged to discharge within the tank below the normal liquid level in the tank, and an air transfer valve mounted within the fill pipe above the normal maximum liquid level, said valve being normally closed and having an outlet communicating with the head space in the tank and an inlet directed away from the direction of fluid flow in the fill pipe, and operating means within said valve for opening said valve in response to increased pressure in the fill pipe arising from air or vapour carried by fuel flowing in said pipe.

The air transfer valve is conveniently attached to the inside of the fill pipe, just above the normal maximum liquid level, and includes operating means comprising a valve which is normally held in its closed position by gravity or a light closure spring. When air enters the top of the fill pipe, e.g. when it is connected to a road tanker's fuel supply pipe, there is an increase in pressure due to the column of liquid fuel from the tanker compressing air in the fuel supply pipe. The weight of the valve member or the strength of the closure spring is chosen so that, in these circumstances, the valve will open and allow air to pass through the valve and into the head space of the tank through an opening in the wall of the fill pipe. The body of the valve may have an outlet aligned with a hole through the fill pipe wall and sealed thereto.

The valve has an inlet which faces away from the direction of fluid flow in the fill pipe so that fuel does not directly impinge on the inlet to the valve. The housing of the valve is preferably streamlined in shape so as to cause minimum disruption to the flow of fuel into the tank.

A flame arrester is preferably incorporated in the inlet to the valve in order to prevent any flame transfer between the fill pipe and the ullage.

The air transfer valve preferably includes a second valve whose purpose is to prevent the flow of liquid fuel through the air transfer valve and into the ullage of the tank. The second valve is normally open but closes in response to liquid entering the housing of the air transfer valve. Conveniently, the valve is hollow, e.g. a hollow plastic or metal ball, which is buoyant and thus rises and floats on liquid fuel entering the housing of the air transfer valve. In order to prevent the second valve rising and closing onto its seat in response to increased air pressure in the fill pipe, the hollow ball or other valve member constituting the second valve is retained in its open position by a venturi effect generated by air flow through the valve housing.

BRIEF DESCRIPTION OF THE DRAWINGS

One embodiment of a fuel storage tank, e.g. a gasoline storage tank in accordance with the invention, and an air transfer valve for use therein, will now be described with reference to the accompanying drawings, in which.

DETAILED DESCRIPTION OF THE INVENTION

Figure 1:
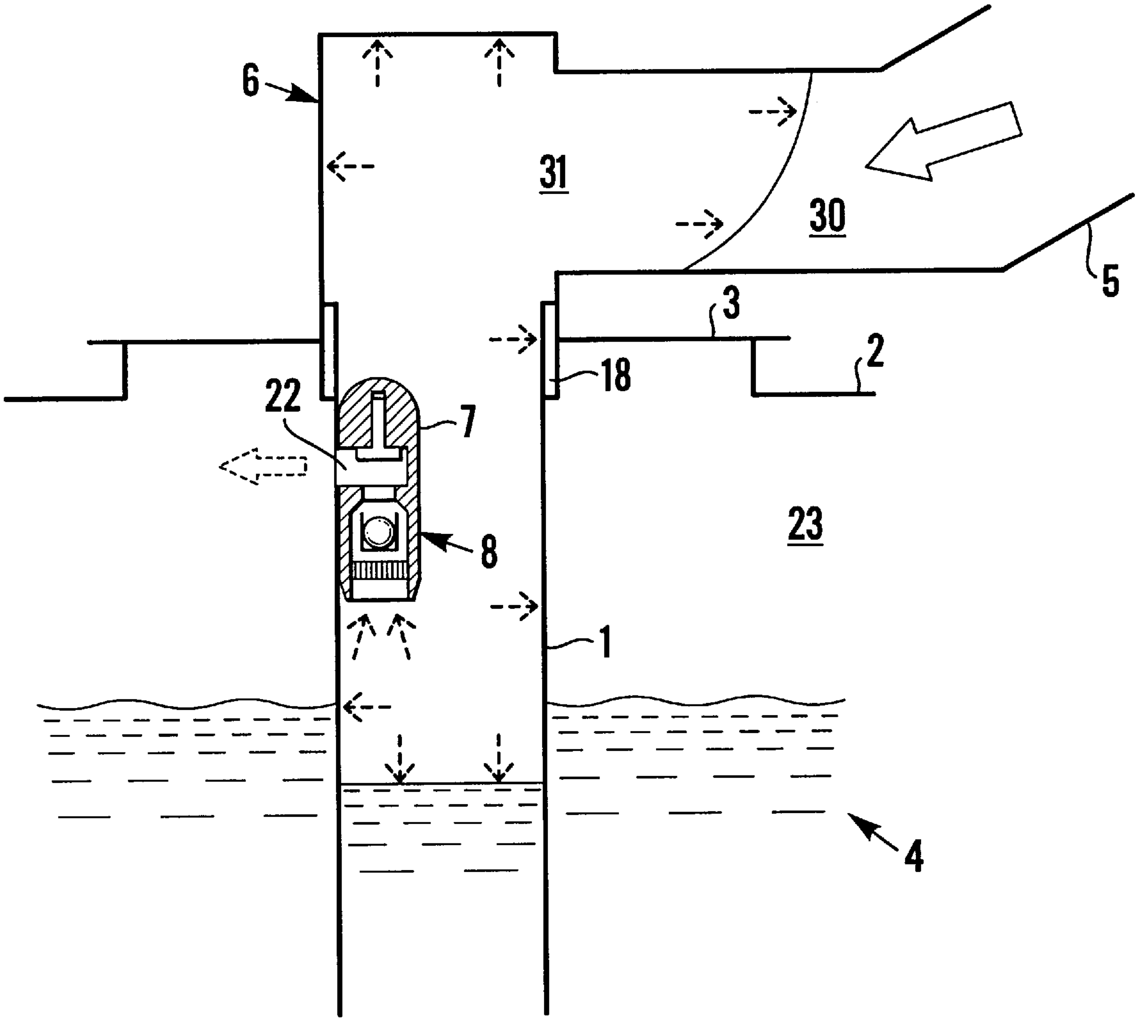
FIG. 1 shows schematically the top part of the fuel storage tank with the air transfer valve in its open condition.

Referring to the drawings:

FIG 1 shows a fuel fill pipe 1 extending into a fuel storage tank 2 through a manhole or inspection cover 3. As can be seen, the pipe 1 extends below the normal liquid level 4 in the tank and, in fact, although not shown in the drawings, will extend to within a few inches from the base of the tank. Fuel is transferred to the fill line 1 from a hose 5, connected to the delivery tanker via a T-piece connector 6. Although not shown in the drawing, a conventional supply valve at the tanker can be shut off after the delivery has been concluded in accordance with normal practice.

Mounted within the fill pipe 1 and above the normal liquid level 4, is an air transfer valve 7. Valve 7 is of compact construction and has a streamlined housing 8 so as to minimise disturbance of fluid flow into the tank. As can be seen, the cross-section of the housing 8 is small, relative to the cross-sectional diameter of the fill pipe 1.

The fill tube is constructed separately from the T-piece connector 6. This arrangement enables the air transfer valve to be pre-assembled and sealed to the inner wall of the tube and cut to the desired length appropriate for the tank. At its upper end, the fill tube may have a lip or collar 18 for supporting the tube in the manhole cover 3. A conventional seal may be provided, e.g. a threaded port, for sealing the T-piece connector 6 to the collar 18 or manhole cover 3.

Figure 3:
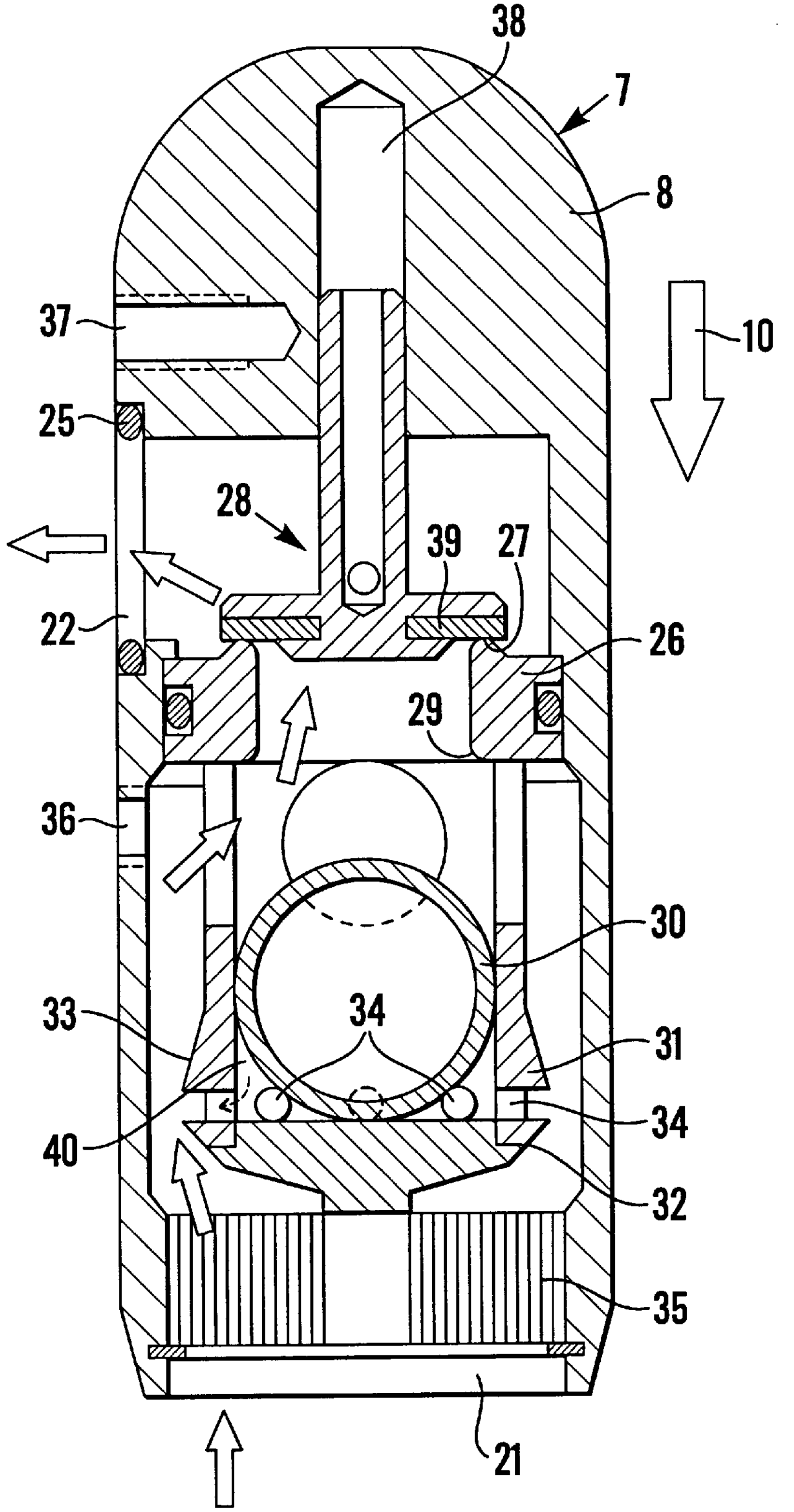
FIG. 3 is a longitudinal section through the air transfer valve on a larger scale.

The air transfer valve is shown in more detail in FIG. 3, from which it can be seen that the body 8 includes an inlet 21, directed away from the direction of fluid flow 10, and an outlet 22 into the head space 23 of the fuel tank 2. The body 8 is secured to the inner wall of the fill tube by bolts (not shown) passing through holes in the fill tube and into threaded sockets 36,37 in the body 8. Outlet 22 is sealed to a corresponding sized hole in the wall of the fill pipe 1 by means of an "O" ring seal 25. Within the valve housing is located a double seat assembly 26 having a first valve seat 27, onto which the first valve member 28 closes. Valve 28 is guided for sliding movement in a bore 38 in body 8 and the face of the valve has a soft disk-like liner 39 arranged to contact the raised annular seat 27 in the closed position. Valve member 28 is normally in the closed position as shown in FIG. 3, either because of the weight of the valve member or by virtue of a light closure spring, e.g. a coil spring (not shown).

Seat assembly 26 also has a second seat 29, against which a float ball valve 30 may close to prevent fluid passing directly into the head space of the tank as will be described hereinafter.

Referring back to FIG. 1, this shows a typical initial filling condition in which an advancing column of fuel first arrives at the T-piece 6, carrying in front of it a mass of air 31. This mass of air is compressed by the advancing column of fuel, causing pressure to rise in the space at the head of the fill pipe 1. Increased pressure causes the valve member 28 to rise off its seat 27, as shown in FIG. 1, and for air to flow through the inlet 21, around the float ball 30 and through the outlet 22 into the tank ullage, as shown by the arrow in FIG. 3.

As can be seen in FIG. 3, the float ball 30 normally rests within an enclosure 31, having chamfered outer faces 32 and 33 and outlets 34. Float ball 30 is hollow and lightweight and is preferably made from fuel-resistant plastics material. As a result of air flowing through the gap between the housing and the sloping faces 32 and 33 of enclosure 31, a venturi effect is generated which causes air to be sucked out of the space between the ball and the lower part 40 of enclosure 31, thereby restraining the float from moving upwardly onto the valve seat 29, when air flows into the inlet 21 under the influence of increased pressure within the fill tube.

As shown in FIG. 3, the inlet 21 to the housing 8 is protected with a flame arrester 35. This may be, for example, of the gauze-type but is preferably of the ribbon type comprising a corrugated strip of thin metal sheet.

Figure 2:
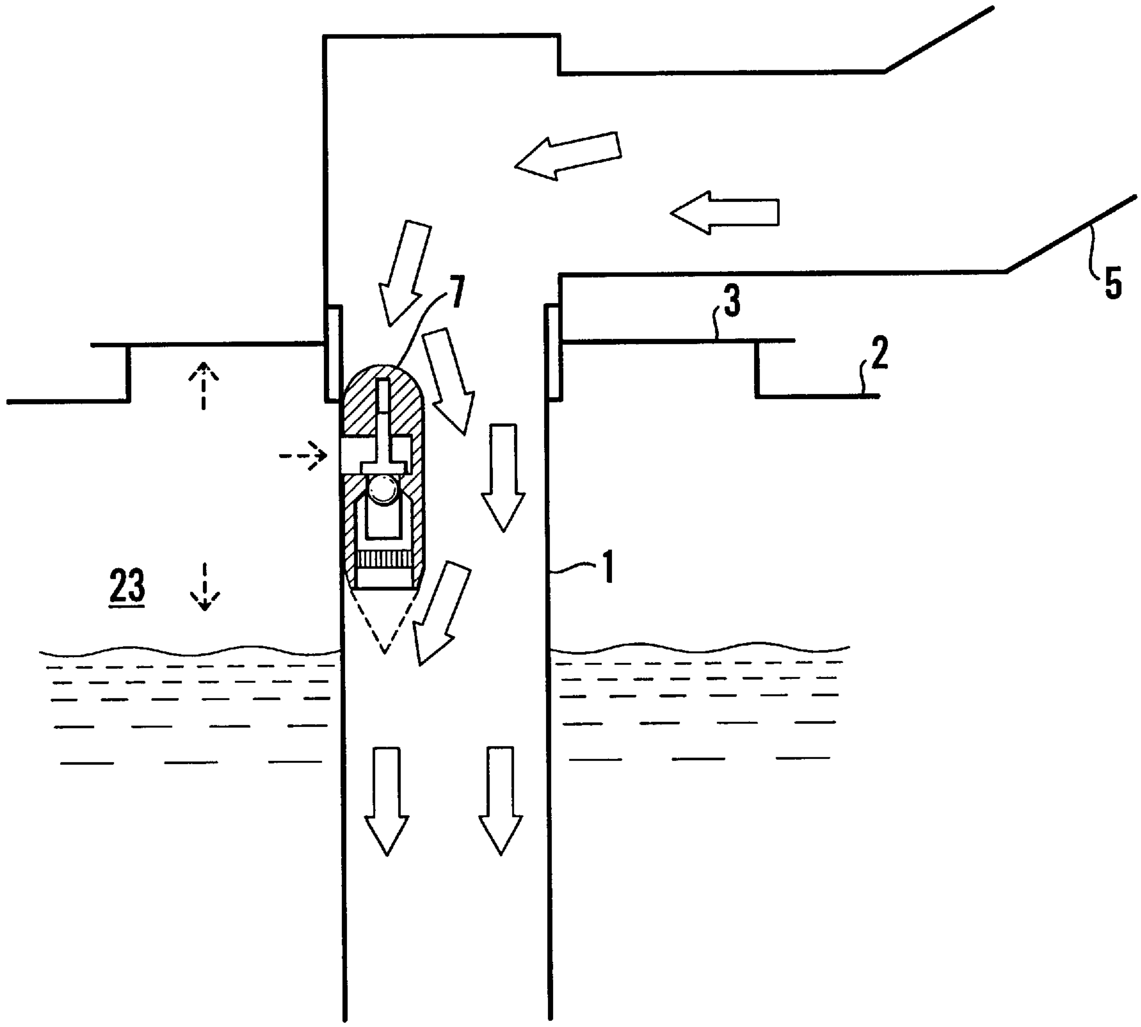
FIG. 2 is the same view showing the condition of the air transfer valve during normal fuel flow into the tank.

FIG. 2 shows the situation after the air has passed out of the air transfer valve, and the column of moving fuel is then sweeping past the air transfer valve. In this condition, a zone of reduced pressure is initially formed at the transfer valve inlet 21. Valve 28 is closed under the combined effects of the vacuum zone, vapour pressure in the ullage and the weight of the valve member itself. As back pressure gradually increases in the fill pipe due to the rising tank level, and liquid fuel enters the housing 8, the effect is to lift the ball 30 and cause it to rise and float in the liquid, thereby seating against the seat 29. Gradually increasing pressure in the fill tube does not cause a significant gas flow through the gap between the housing and the faces 32,33 and therefore there is little or no venturi suction effect in the passages 34. This upward movement of the float ball 30 and seating on seat 29 provides a positive safeguard against the transfer of liquid of directly from the fill pipe into the ullage. When the delivery is complete, the pressure in the ullage and fill tube equalise and the float valve drops back into the enclosure 31. In this condition, the valve 28 will also be on its seat 27 because of its weight or light return spring. The flame arrester 35 has the effect to some extent of separating vapour from liquid fuel so that when the mixture of vapour and liquid fuel reaches the inlet 21, the vapour will preferentially pass through.

Figure 4:
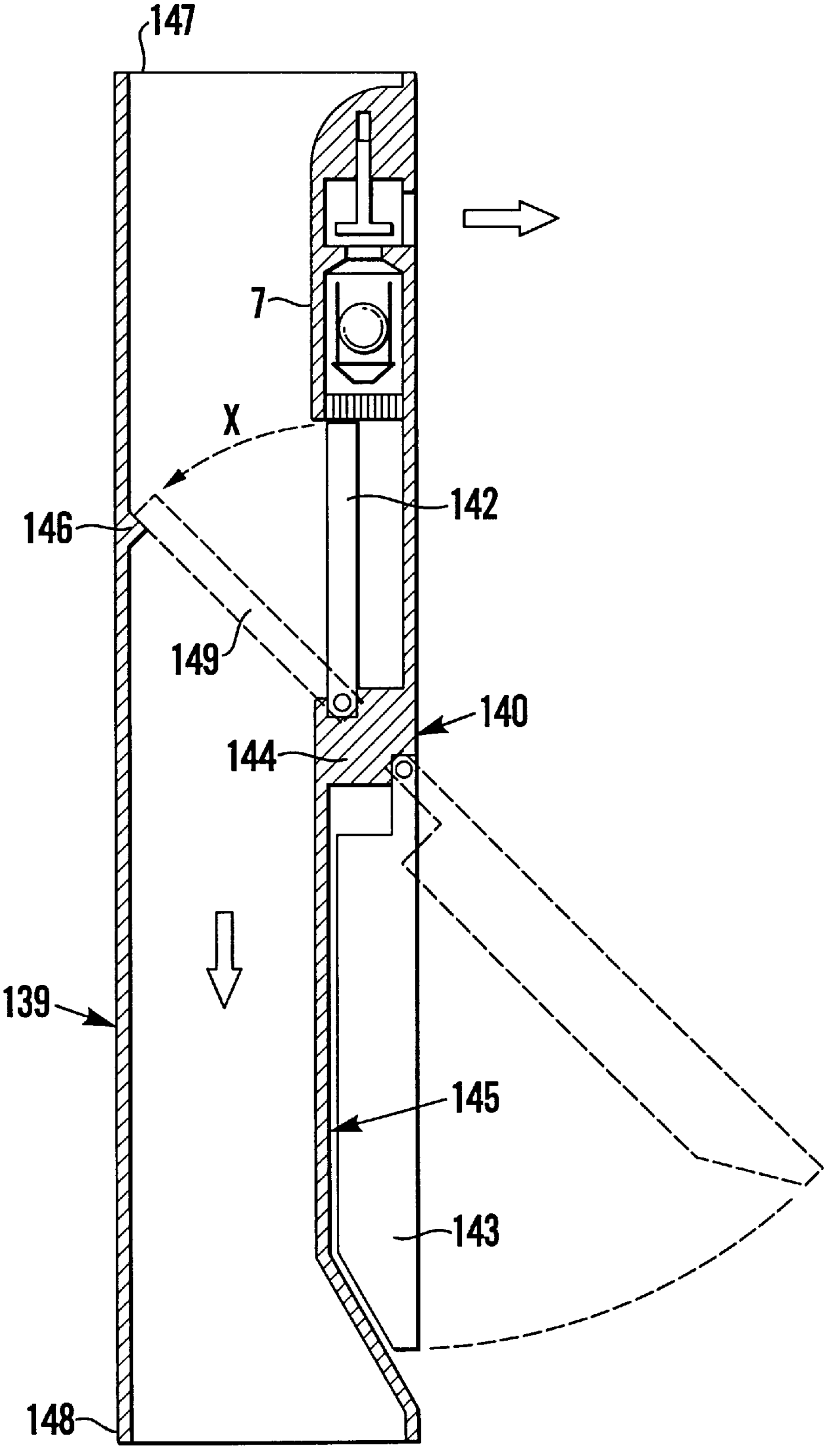
FIG. 4 is a longitudinal section through a fill pipe fitted with an air transfer valve in accordance with the invention, but on a larger scale than FIGS. 1 and 2 and showing an overfill valve fitted into a tubular housing member.

Referring now to FIG. 4, this shows a modification in which air transfer valve 7 is mounted in a tubular member 139, with an overfill valve 140. The tubular member 139 has the same diameter as the fill tube 1 shown in FIGS. 1 and 2, and can be fitted to a standard fill tube of appropriate length by a conventional spigot or pipe coupling at its upper and lower ends 147 and 148. Thus, the overfill valve and the air transfer valve can be manufactured and assembled as a single unit and fitted to the fill tube of a fuel tank.

The construction and location of the air transfer valve 7 is as shown in FIG. 3.

The overfill valve 140 shown in the drawing is of a simple construction and is of a type which is conventionally fitted to fill tubes without requiring any external connections. Valves of this type are commercially available, for example, from OPW Fuel & Components, PO Box 405003, Cincinnati, Ohio, U.S.A 45240/5003. The overfill valve is mounted on the same side of the fill tube as the air transfer valve and comprises a flap valve 142 in the form of a vane 149 and a float assembly 143. The float assembly comprises a hollow paddle-shaped member pivotably mounted on a support member 144 attached to or an integral part of the wall of the tubular member. Flap valve 142 is also pivotably mounted on the support member 144 and is linked to the float 143 so that the two components pivot together. As shown in the drawings, float 143 nests in a recess 145 in its rest position.

FIG. 4 shows in broken lines the position of the float assembly and flap valve when liquid in the tank has risen to a point approximating to the level of the support member 144. In this position, the float assembly is floated upwardly in the liquid fuel and causes the vane of the flap valve to pivot in the direction of arrow X until it hits a stop 146 on the inside of the tubular member. The vane of the flap valve is shaped so that in the position shown in dotted lines, it essentially blocks the tubular member. In other words, it will be essentially oval in shape with the smaller diameter approximating to the diameter of the fill tube. Closure of the flap valve will transmit a pressure signal along the tube 5, which will be sensed by the operator of the road tanker, who will then shut off the flow of fuel at the road tanker. Liquid fuel in the supply pipe will leak past the vane 149 and enter the tank. Meanwhile, liquid fuel flowing past the air transfer valve and entering inlet 21 will raise the float ball and this will prevent liquid fuel entering the ullage.

I claim:

1. A fuel storage tank having a base and comprising (a) a fill pipe located within the tank and connected to an inlet external of the tank for flowing fuel into the tank, said fill tube being arrange to discharge fuel in the vicinity of the tank base, and (b) an air transfer valve mounted within the fill tube above a normal maximum fuel level in the tank, said valve being normally closed, having an outlet communicating directly with a head space in the tank above said normal maximum fuel level and an inlet communicating with the interior of the fill tube, and valve operating means for opening said valve in response to an increase in pressure in the fill tube.

2. A fuel storage tank as claimed in claim 1 wherein the inlet of the air transfer valve is directed in such a way that fuel flowing into the fill tube does not flow into the inlet.

3. A fuel storage tank as claimed in claim 2 wherein said inlet is associated with deflector means for shielding said inlet from fuel flowing in said fill tube.

4. A fuel storage tank as claimed in claim 1 wherein said air transfer valve comprises a first non-return valve member which is normally in a closed position and opens in response to an increase in pressure in the fill tube, and a second valve member which is normally open and which closes in response to liquid entering the inlet of the air transfer valve.

5. A fuel storage tank as claimed in claim 4 wherein said second valve includes a venturi which is activated to retain said second valve in its open position so long as air flows through the valve.

6. A fuel storage tank as claimed in claim 1 wherein an overfill valve comprising a float is located in the vicinity of the air transfer valve but below said air transfer valve, the arrangement being such that said float rises when fuel reaches said normal maximum level in the tank and causes said overfill valve to close, thus preventing further fuel entering the tank.

7. An fuel storage tank as claimed in claim 6 wherein said overfill valve is mounted in a housing which also incorporates the air transfer valve, wherein the air transfer valve and the overfill valve are assembled as a single unit with the fill tube.

* * * * *